US012574127B2

(12) United States Patent
Rajpoot et al.

(10) Patent No.: US 12,574,127 B2
(45) Date of Patent: Mar. 10, 2026

(54) PRIORITIZATION OF SERVICE GAPS IN A WIRELESS NETWORK

(71) Applicant: Rakuten Symphony, Inc., Tokyo (JP)

(72) Inventors: Atul Rajpoot, Indore (IN); Durgesh Rathore, Indore (IN); Sudeep Kumar Jain, Indore (IN); Nilesh Bankar, Indore (IN)

(73) Assignee: RAKUTEN SYMPHONY, INC., Setagaya-ku (JP)

( * ) Notice: Subject to any disclaimer, the term of this patent is extended or adjusted under 35 U.S.C. 154(b) by 447 days.

(21) Appl. No.: 18/020,996

(22) PCT Filed: Dec. 28, 2022

(86) PCT No.: PCT/US2022/054109
§ 371 (c)(1),
(2) Date: Feb. 13, 2023

(87) PCT Pub. No.: WO2024/107213
PCT Pub. Date: May 23, 2024

(65) Prior Publication Data
US 2025/0070898 A1 Feb. 27, 2025

(30) Foreign Application Priority Data
Nov. 15, 2022 (IN) .............................. 202221065426

(51) Int. Cl.
*H04B 17/318* (2015.01)
*H04L 41/0823* (2022.01)
(52) U.S. Cl.
CPC ....... *H04B 17/328* (2023.05); *H04L 41/0823* (2013.01)

(58) Field of Classification Search
CPC ... H04B 17/328; H04L 41/0823; H04W 16/18
See application file for complete search history.

(56) References Cited

U.S. PATENT DOCUMENTS

| | | | | |
|---|---|---|---|---|
| 2003/0008619 | A1* | 1/2003 | Werner | H04W 4/021 |
| | | | | 455/67.11 |
| 2016/0219482 | A1* | 7/2016 | Smith | H04W 36/30 |
| 2020/0236559 | A1* | 7/2020 | Spiotta | H04W 16/18 |
| 2022/0329524 | A1* | 10/2022 | Sinha | H04L 41/0896 |
| 2024/0298189 | A1* | 9/2024 | Jain | H04W 16/18 |

OTHER PUBLICATIONS

Written Opinion of the International Searching Authority dated May 2, 2023 in Application No. PCT/US22/54109.
International Search Report of the International Searching Authority dated May 2, 2023 in Application No. PCT/US22/54109.

* cited by examiner

*Primary Examiner* — Charles C Jiang
*Assistant Examiner* — Ryan C Kavleski
(74) *Attorney, Agent, or Firm* — Sughrue Mion, PLLC

(57) ABSTRACT

Embodiments herein provide a method for prioritizing service gaps in a wireless network (1000) by an electronic device (100). The method includes receiving information about a plurality of service gaps. Further, the method includes determining a priority for each service gap of the plurality of service gaps based on an area factor, a morphology factor, a RSRP bad samples factor, and a user density factor of each service gap of the plurality of service gaps. Further, the method includes prioritizing the plurality of service gaps for mitigation based on the priority for each service gap of the plurality of service gaps.

20 Claims, 7 Drawing Sheets

S300

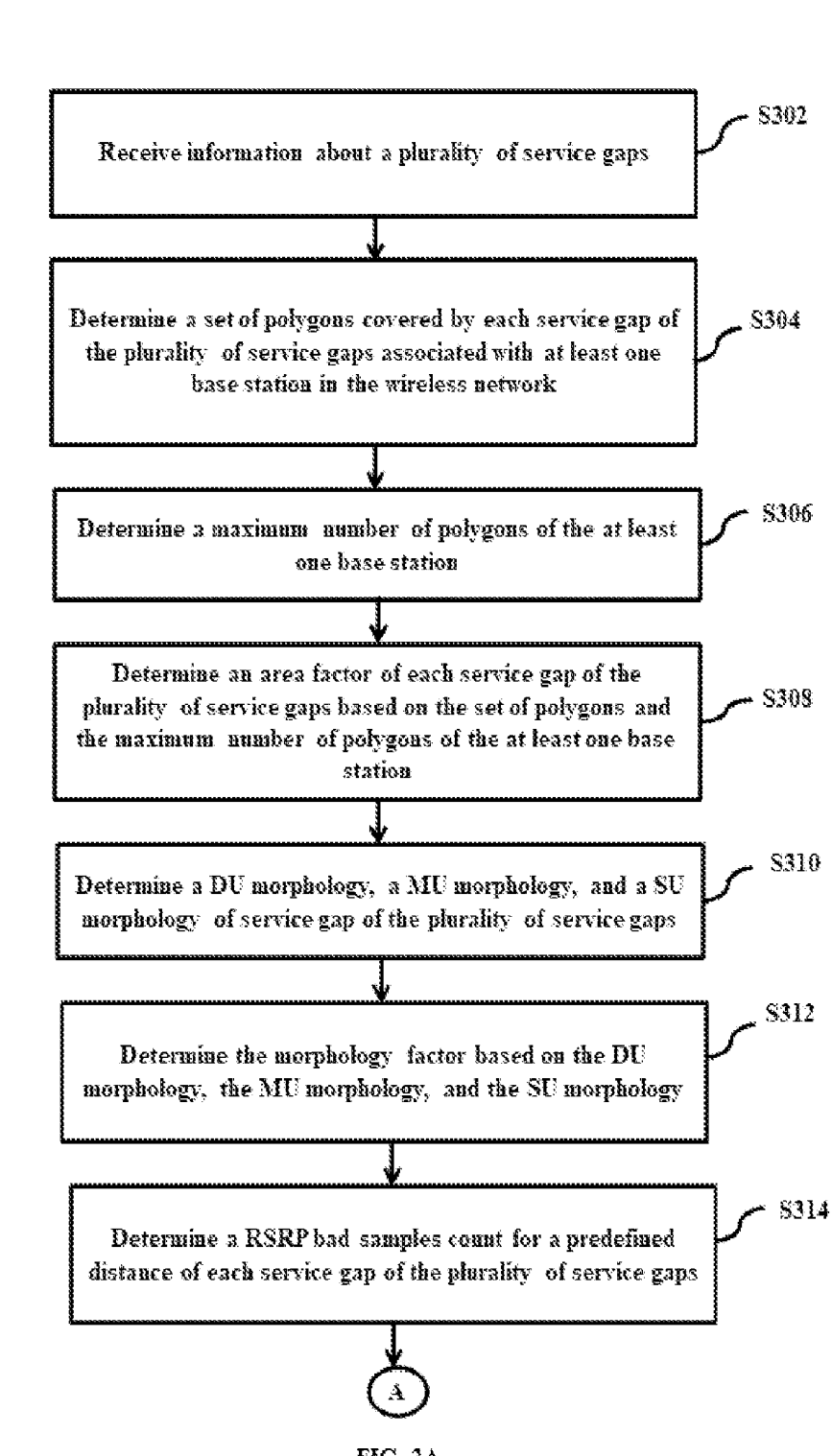

S302

Receive information about a plurality of service gaps

S304

Determine a set of polygons covered by each service gap of the plurality of service gaps associated with at least one base station in the wireless network

S306

Determine a maximum number of polygons of the at least one base station

S308

Determine an area factor of each service gap of the plurality of service gaps based on the set of polygons and the maximum number of polygons of the at least one base station

S310

Determine a DU morphology, a MU morphology, and a SU morphology of service gap of the plurality of service gaps

S312

Determine the morphology factor based on the DU morphology, the MU morphology, and the SU morphology

S314

Determine a RSRP bad samples count for a predefined distance of each service gap of the plurality of service gaps

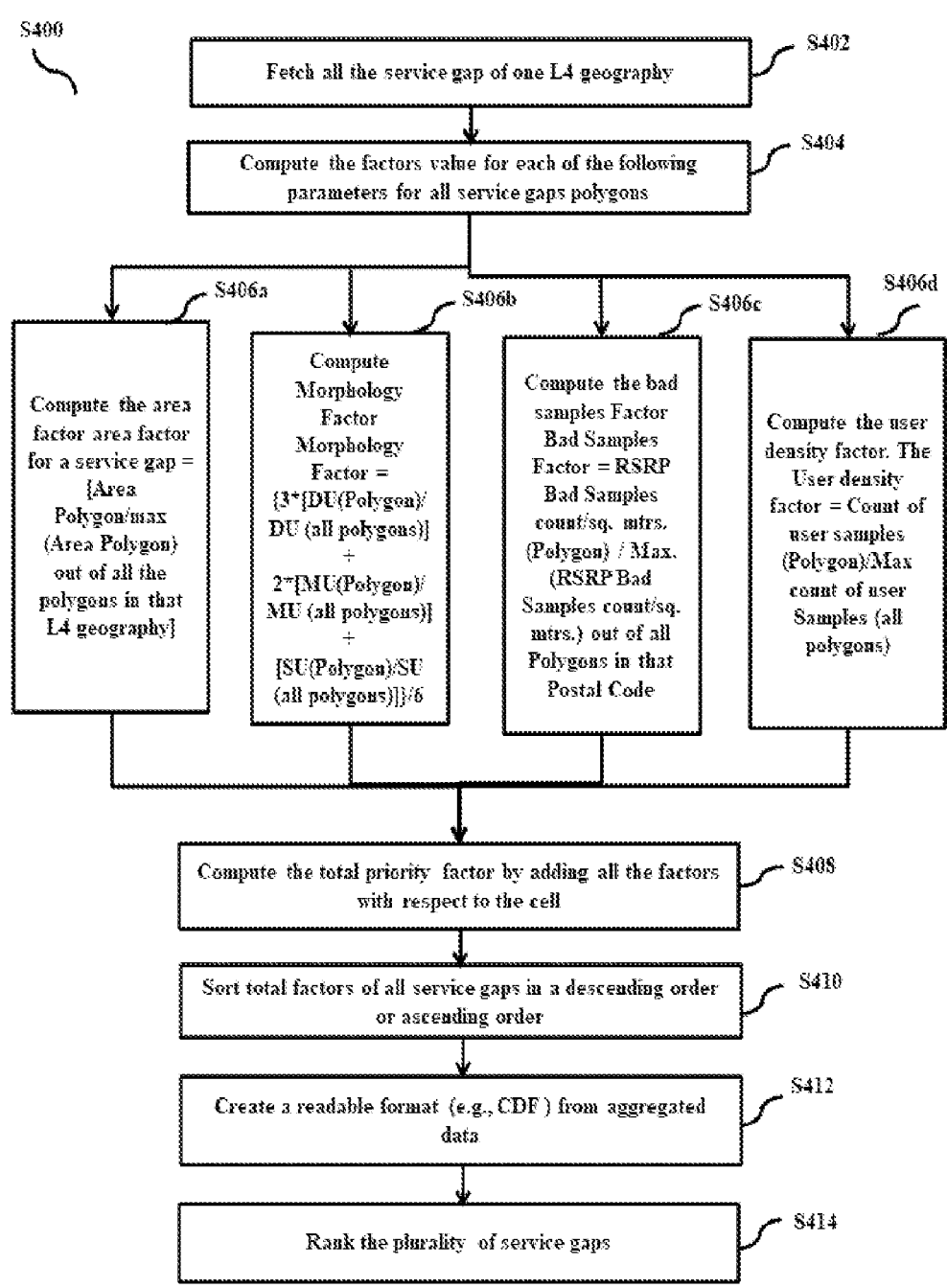

Fetch all the service gap of one L4 geography — S402

Compute the factors value for each of the following parameters for all service gaps polygons — S404

S406a
Compute the area factor area factor for a service gap = {Area Polygon/max (Area Polygon) out of all the polygons in that L4 geography}

S406b
Compute Morphology Factor Morphology Factor = {3*[DU(Polygon)/ DU (all polygons)] ÷ 2*[MU(Polygon)/ MU (all polygons)] ÷ [SU(Polygon)/SU (all polygons)]}/6

S406c
Compute the bad samples Factor Bad Samples Factor = RSRP Bad Samples count/sq. mtrs. (Polygon) / Max. (RSRP Bad Samples count/sq. mtrs.) out of all Polygons in that Postal Code S406d
Compute the user density factor. The User density factor = Count of user samples (Polygon)/Max count of user Samples (all polygons)

Compute the total priority factor by adding all the factors with respect to the cell — S408

Sort total factors of all service gaps in a descending order or ascending order — S410

Create a readable format (e.g., CDF ) from aggregated data — S412

Rank the plurality of service gaps — S414

FIG. 4

PRIORITIZATION OF SERVICE GAPS IN A WIRELESS NETWORK

CROSS REFERENCE TO RELATED APPLICATIONS

This application is a National Stage of International Application No. PCT/US2022/054109, filed Dec. 28, 2022, claiming priority to Indian Patent Application No. 202221065426, filed Nov. 15, 2022.

FIELD OF INVENTION

The present disclosure relates to a wireless network, and more particularly to a method and an electronic device for prioritizing service gaps in the wireless network.

BACKGROUND

In general, a network service provider desires to provide optimal cellular coverage for users for providing a network service (e.g., voice call, video call, messaging service or the like). The network service provider try to avoid coverage gaps or service gaps in a wireless network. The service gap or the coverage gap is the polygon generated over a smart network coverage layer, which shows a poor coverage zone in the wireless network. The coverage gaps or the service gaps may be happened by various issues (e.g., poor designs (such as unsuitable antenna parameters, or inadequate radio frequency (RF) planning), changing design dynamics, inaccurate design parameters, capacity and cell edge changes over time, performance optimization, physical obstructions (such as new buildings and hills) or the like). The coverage gaps or service gaps exist in a single cell or a node of the wireless network, or in a vicinity of a border between adjacent cells (i.e., at a cell edge). Hence, there is a need to a method and an electronic device to prioritize service cells (e.g., network coverage loopholes or network gaps) so that a user (e.g., radio frequency (RF) engineer or operator) gets to know the exact severity of the service cells to optimize the service cells for providing better service to a customer, also avoid the coverage gaps or the service gaps in the wireless network, but existing methods and systems do not have any prior techniques or methods to prioritize the service cells. Thus, results in reducing/degrading a user service experience.

Thus, it is desired to address the above-mentioned disadvantages or other shortcomings or at least provide a useful alternative.

OBJECT OF INVENTION

The principal object of the embodiments herein is to provide a method and an electronic device for prioritizing service gaps in a wireless network. The proposed method can be used to prioritize the service cells (e.g., network coverage loopholes or network gaps) so that a user (e.g., radio frequency (RF) engineer, operator or the like) of the electronic device gets to know the exact severity of the service cells to optimize the service cells for providing better service to the customer. The method can be used to assist the user to decide which service cells should be mitigate first based on the identified priority in order to improve the network performance in an important geographical area. The method can be used to avoid coverage gaps or service gaps in the wireless network.

SUMMARY

Accordingly, the embodiment herein discloses an electronic device for prioritizing service gaps in a wireless network. The electronic device includes a memory and a processor. The processor is configured to receive information about a plurality of service gaps. Further, the processor is configured to determine an area factor for each service gap of the plurality of service gaps. Further, the processor is configured to determine a morphology factor of each service gap of the plurality of service gaps. Further, the processor is configured to determine a Reference Signal Received Power (RSRP) bad samples factor of each service gap of the plurality of service gaps. Further, the processor is configured to determine a user density factor of each service gap of the plurality of service gaps. Further, the processor is configured to determine a priority for each service gap of the plurality of service gaps based on the area factor, the morphology factor, the RSRP bad samples factor, and the user density factor of each service gap of the plurality of service gaps. Further, the processor is configured to prioritize the plurality of service gaps for mitigation based on the priority for each service gap of the plurality of service gaps.

Accordingly, the embodiment herein discloses a method for prioritizing service gaps in a wireless network. The method includes receiving, by an electronic device in the wireless network, information about a plurality of service gaps. Further, the method includes determining, by the electronic device, an area factor for each service gap of the plurality of service gaps. Further, the method includes determining, by the electronic device, a morphology factor of each service gap of the plurality of service gaps. Further, the method includes determining, by the electronic device, a Reference Signal Received Power (RSRP) bad samples factor of each service gap of the plurality of service gaps. Further, the method includes determining, by the electronic device, a user density factor of each service gap of the plurality of service gaps. Further, the method includes determining, by the electronic device, a priority for each service gap of the plurality of service gaps based on the area factor, the morphology factor, the RSRP bad samples factor, and the user density factor of each service gap of the plurality of service gaps. Further, the method includes prioritizing, by the electronic device, the plurality of service gaps for mitigation based on the priority for each service gap of the plurality of service gaps.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

The method and the electronic device are illustrated in the accompanying drawings, throughout which like reference letters indicate corresponding parts in the various figures. The embodiments herein will be better understood from the following description with reference to the drawings, in which:

FIG. 3A to FIG. 3B are flow charts illustrating a method for prioritizing service gaps in the wireless network, according to the embodiments as disclosed herein;

FIG. 4 is an example flow chart illustrating a method for prioritizing service gaps in the wireless network, according to the embodiments as disclosed herein;

DETAILED DESCRIPTION OF INVENTION

Figure 1:
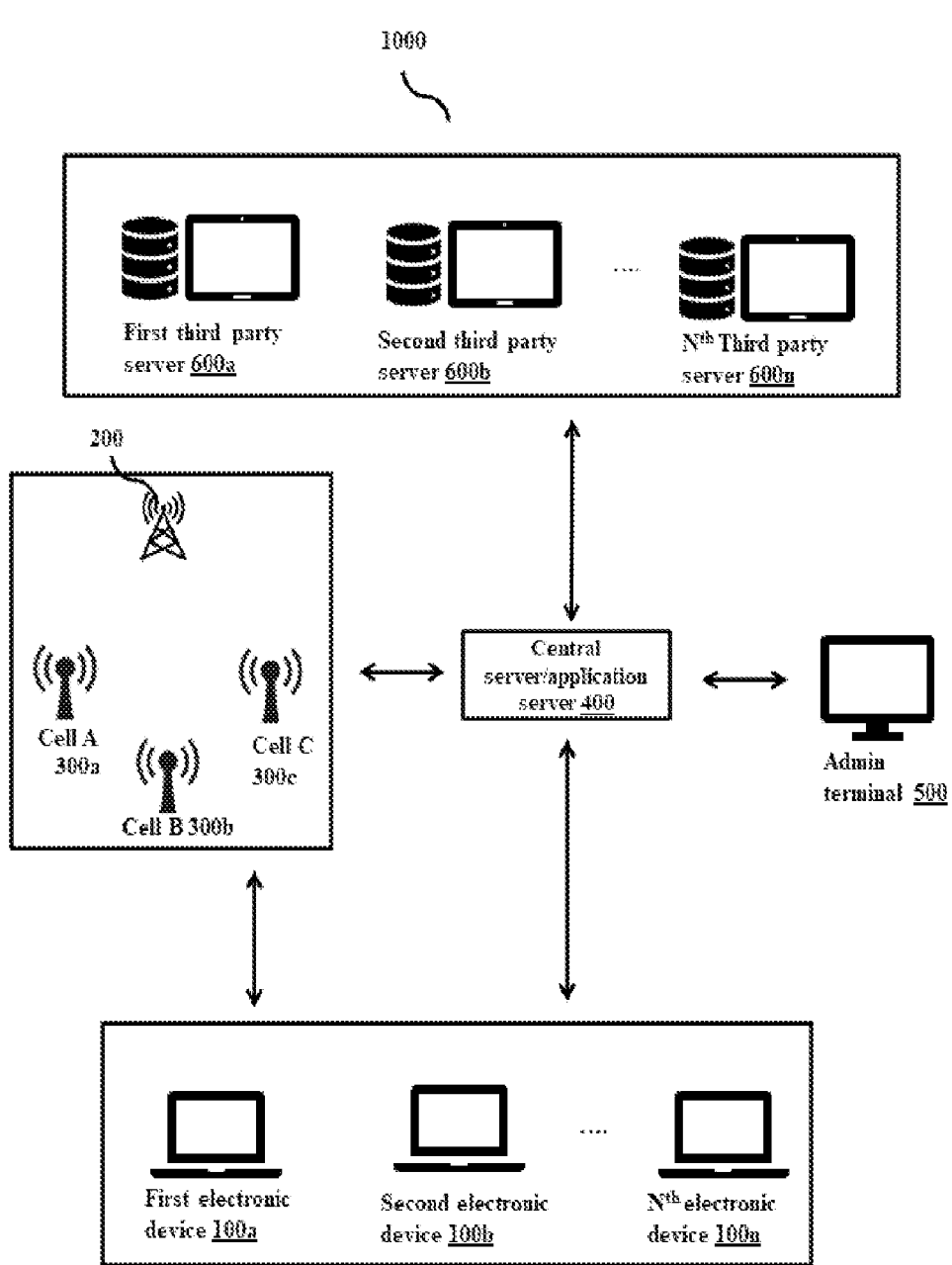
FIG. 1 is an example overview of a wireless network for prioritizing service gaps, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide an electronic device for prioritizing service gaps in a wireless network. The electronic device includes a memory and a processor. The processor is configured to receive information about a plurality of service gaps. Further, the processor is configured to determine an area factor for each service gap of the plurality of service gaps. Further, the processor is configured to determine a morphology factor of each service gap of the plurality of service gaps. Further, the processor is configured to determine a RSRP bad samples factor of each service gap of the plurality of service gaps. Further, the processor is configured to determine a user density factor of each service gap of the plurality of service gaps. Further, the processor is configured to determine a priority for each service gap of the plurality of service gaps based on the area factor, the morphology factor, the RSRP bad samples factor, and the user density factor of each service gap of the plurality of service gaps. Further, the processor is configured to prioritize the plurality of service gaps for mitigation based on the priority for each service gap of the plurality of service gaps.

Unlike conventional methods and systems, the proposed method can be used to prioritizing service gaps (e.g., network coverage loopholes or network gaps) so that a user (e.g., radio frequency (RF) engineer, operator or the like) of the electronic device gets to know the exact severity of the service cells to optimize the service cells for providing better service to the customer. The method can be used to assist the user to decide which service cells should be mitigate first based on the identified priority in order to improve the network performance in an important geographical area. The method can be used to avoid coverage gaps or service gaps in the wireless network.

Referring now to the drawings and more particularly to FIGS. 1 through 7, where similar reference characters denote corresponding features consistently throughout the figures, there are shown preferred embodiments.

FIG. 1 is an example overview of a wireless network (1000) for prioritizing service gaps, according to the embodiments as disclosed herein. The wireless network (1000) can be, for example, but not limited to, a fourth generation (4G) network, a fifth generation (5G) network, a sixth generation (6G) network, an open radio access network (ORAN) network or the like. In an embodiment, the wireless network (1000) includes a plurality of electronic device (100a-100n), a base station (200), a plurality of cells (300a-300c), a central server/application server (400), an admin terminal (500) (e.g., computer, laptop or the like) and a plurality of third party servers (600a-600c). The central server/application server (400), the admin terminal (500) and the plurality of third party servers (600a-600c) monitor and store information about the service gaps.

In the wireless network (1000), base stations (or network elements) (200) are providing a service in the cells (300a-300c), respectively. The base station (200) provides the service to the electronic devices (100a-100c) in the cells (300a-300c). The service can be, for example, but not limited to a call service, a voice communication service, a messaging service, a video streaming service, Internet of Things (IoT) services or the like. Hereafter, the label of the electronic device is 100 and the cell is 300.

The service cells is a cell in a service area in which a signal strength of a wireless network (1000) experienced by the electronic device (100) is insufficient to maintain connectivity and there is no coverage from an alternative cell or the adjacent cell. In an example, a service cell can exist in the cell (200a) where a signal to noise ratio (SNR) or a signal to interference plus noise ratio (SINR) of a serving and neighbouring cells, such as 3GPP LTE cells or New radio (NR) call, is below a threshold level to maintain a basic service to the electronic device (100).

Alternately, the service gap is determined by using a planning prediction layer and a live data drive test layer. The planning prediction layer and the live data drive test layer are operated together (as unified layer) to improve the service. In an example, the planning prediction layer defines that the base station (200) provides a cell coverage of 500 meter in some place and other places, the base station (200) provides a cell coverage of 800 meter. In an example, the live data drive test layer identifies non-service coverage in the planning prediction layer. The service gap indicates a poor service area (based on a RSRP value). In other words, the service gaps are the polygon generated over a smart network coverage layer, which shows the poor coverage zone in the wireless network (1000). The proposed method can be used to generate the service gaps for each band periodically and provide optimization suggestions to improve coverage. It provides the tracking of the service gaps improvement as well.

The electronic device (100) can be, for example, but not limited to a computer system, a host server, a personal computer, a smart phone, a Personal Digital Assistant (PDA), a tablet computer, a laptop computer, an Internet of Things (IoT), embedded systems, edge devices, a vehicle to everything (V2X) device or the like.

The electronic device (100) receives information about a plurality of service gaps. The information can be, for example, but not limited to radio frequency (RF) planning, changing design dynamics, cell capacity, cell edge changes over time, performance optimization, physical obstruction information, antenna azimuth or the like.

Further, the electronic device (100) determines an area factor for each service gap of the plurality of service gaps. In an embodiment, the electronic device (100) determines a set of polygons (i.e., poor coverage area named as service gap polygons) covered by each service gap of the plurality of service gaps associated with a base station (200) in the wireless network (1000). Further, the electronic device (100) determines a maximum number of polygons of the base station (200). Based on the set of polygons and the maximum number of polygons of the base station (200), the electronic device (100) determines the area factor of each service gap of the plurality of service gaps. In an example, the electronic device (100) determines the area factor using equation (1).

$$\text{Area Factor for a Service Gap [Area Polygon/max (Area Polygon) out of all the polygons in that Postal Code].} \qquad (1)$$

Further, the electronic device (100) determines a morphology factor of each service gap of the plurality of service gaps. In an embodiment, the electronic device (100) determines a DU morphology, a MU morphology, and a SU morphology of service gap of the plurality of service gaps. Further, the electronic device (100) determines the morphology factor based on the DU morphology, the MU morphology, and the SU morphology. In an example, the electronic device (100) determines the morphology factor of each service gap of the plurality of service gaps using the equation (2).

$$\text{Morphology Factor} = \qquad (2)$$
$$\{3*[DU(\text{Polygon})/DU(\text{all polygons})] + 2*[MU(\text{Polygon})$$
$$/MU(\text{all polygons})] + [SU(\text{Polygons})/SU(\text{all polygons})]\}/6$$

where, DU(Polygon)=Number of DU pixels in the polygon, and DU (all Polygons)=Total number of DU pixels in all the polygons in a postal code (e.g., RF cluster or the like). The RF cluster is the L4 geography and the prioritization techniques works on the basis of each L4 geography.

In an example, the multiplicative factor corresponding to the morphology name is determined based on Table 1.

TABLE 1

| Morphology Name | Multiplicative Factor |
|---|---|
| DU | 3 |
| MU | 2 |
| SU | 1 |
| Others | 0 |

In an embodiment, the DU morphology of each service gap of the plurality of service gaps is determined by determining a set of DU polygons covered by each service gap of the plurality of service gaps associated with the base station (200) in the wireless network (1000), determining a maximum number of DU polygons of the base station (200), and determine the DU morphology based on the set of DU polygons, the maximum number of DU polygons, and a weightage associated with the DU morphology. The weightage is set by a RE engineer of the electronic device (100).

In an embodiment, the MU morphology of each service gap of the plurality of service gaps is determined by determining a set of MU polygons covered by each service gap of the plurality of service gaps associated with the base station (200) in the wireless network (1000), determining a maximum number of MU polygons of the base station (200), and determining the MU morphology based on the set of MU polygons, the maximum number of MU polygons, and a weightage associated with the MU morphology. The weightage is set by a RE engineer of the electronic device (100).

In an embodiment, the SU morphology of each service gap of the plurality of service gaps is determined by determining a set of SU polygons covered by each service gap of the plurality of service gaps associated with the base station (200) in the wireless network (1000), determining a maximum number of SU polygons of the base station (200), and determining the SU morphology based on the set of SU polygons, the maximum number of SU polygons, and a weightage associated with the SU morphology. The weightage is set by a RE engineer of the electronic device (100).

Further, the electronic device (100) determines a RSRP bad samples factor of each service gap of the plurality of service gaps. In an embodiment, the electronic device (100) determines the RSRP bad samples count for a predefined distance of each service gap of the plurality of service gaps and determines a maximum number of RSRP bad samples count covered by the base station (200). Based on the RSRP bad samples count and the maximum number of RSRP bad samples count, the electronic device (100) determines the RSRP bad samples factor of each service gap of the plurality of service gaps. In an example, the electronic device (100) determines the RSRP bad samples factor of each service gap of the plurality of service gaps using the equation (3).

Bad Samples Factor RSRP Bad Samples count/
square meters (Polygon) Max. (RSRP Bad
Samples count/square meters) out of all Poly-
gons in that Postal Code       (3)

Further, the electronic device (100) determines a user density factor of each service gap of the plurality of service gaps. In an embodiment, the electronic device (100) retrieves a sample count of each service gap of the plurality of service gaps and determines a maximum samples count covered by the base station (200). Based on the sample count of each service gap of the plurality of service gaps and the maximum samples count, the electronic device (100) determines the user density weightage. In an example, the electronic device (100) determines the user density factor of each service gap of the plurality of service gaps using the equation (4).

User Density Factor=Count of User sample (Poly-
gon)/Max count of user samples (All Polygons)     (4)

Based on the area factor, the morphology factor, the RSRP bad samples factor, and the user density factor of each service gap of the plurality of service gaps, the electronic device (100) determines a priority for each service gap of the plurality of service gaps. Further, the electronic device (100) prioritizes the plurality of service gaps for mitigation based on the priority for each service gap of the plurality of service gaps. In an embodiment, the electronic device (100) sorts the priority of the plurality of service gaps in a descending order or an ascending order. Further, the electronic device (100) ranks the plurality of service gaps based on the sorted priority of the plurality of service gaps. In an example, the electronic device (100) identifies the total priority factor (sum of all factors (discussed above)) for each coverage gap. Further, the electronic device (100) sorts all coverage gaps based on their total factors values within the postal code. Further, the electronic device (100) creates a Computable Document Format (CDF) (or any other readable format) from aggregated data and provides the ranking based on the following percentiles (R1: Ranking better or equal to $95^{th}$ percentile, R2: Ranking in range of $94^{th}$ percentile & $80^{th}$ percentile, R3: Ranking in range of $79^{th}$ percentile & $60^{th}$ percentile, R4: Ranking in range of $59^{th}$ percentile & 30th percentile and R5: Ranking below $30^{th}$ percentile)

Figure 2:
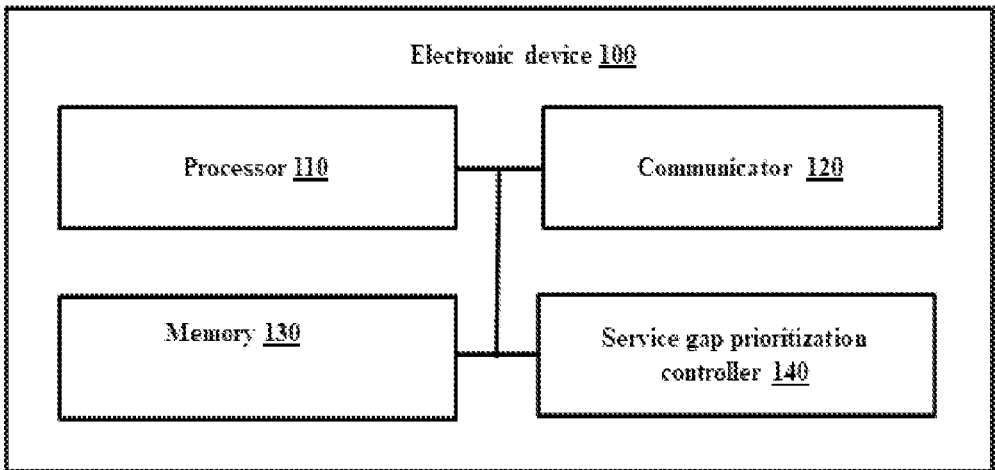
FIG. 2 shows various hardware components of an electronic device for prioritizing service gaps in the wireless network, according to the embodiments as disclosed herein.

FIG. 2 shows various hardware components of the electronic device (100) for prioritizing the service gaps in the wireless network (1000), according to the embodiments as disclosed herein. In an embodiment, the electronic device (100) includes a processor (110), a communicator (120), a memory (130) and a servicing cell prioritization controller (140). The processor (110) is coupled with the communicator (120), the memory (130) and the servicing cell prioritization controller (140).

The servicing cell prioritization controller (140) receives the information about the plurality of service gaps. Further, the servicing cell prioritization controller (140) determines the area factor for each service gap of the plurality of service gaps. In an embodiment, the servicing cell prioritization controller (140) determines the set of polygons covered by each service gap of the plurality of service gaps associated with the base station (200) in the wireless network (1000). Further, the servicing cell prioritization controller (140) determines the maximum number of polygons of the base station (200). Based on the set of polygons and the maximum number of polygons of the base station (200), the servicing cell prioritization controller (140) determines the area factor of each service gap of the plurality of service gaps.

Further, the servicing cell prioritization controller (140) determines the morphology factor of each service gap of the plurality of service gaps. In an embodiment, the servicing cell prioritization controller (140) determines the DU morphology, the MU morphology, and the SU morphology of service gap of the plurality of service gaps. Further, the servicing cell prioritization controller (140) determines the morphology factor based on the DU morphology, the MU morphology, and the SU morphology.

Further, the servicing cell prioritization controller (140) determines the RSRP bad samples factor of each service gap of the plurality of service gaps. In an embodiment, the servicing cell prioritization controller (140) determines the RSRP bad samples count for the predefined distance of each service gap of the plurality of service gaps and determines the maximum number of RSRP bad samples count covered by the base station (200). Based on the RSRP bad samples count and the maximum number of RSRP bad samples count, the servicing cell prioritization controller (140) determines the RSRP bad samples factor of each service gap of the plurality of service gaps.

Further, the servicing cell prioritization controller (140) determines the user density factor of each service gap of the plurality of service gaps. In an embodiment, the servicing cell prioritization controller (140) retrieves the sample count of each service gap of the plurality of service gaps and determines the maximum samples count covered by the base station (200). Based on the sample count of each service gap of the plurality of service gaps and the maximum samples count, the servicing cell prioritization controller (140) determines the user density weightage.

Based on the area factor, the morphology factor, the RSRP bad samples factor, and the user density factor of each service gap of the plurality of service gaps, the servicing cell prioritization controller (140) determines the priority for each service gap of the plurality of service gaps. Further, the servicing cell prioritization controller (140) prioritizes the plurality of service gaps for mitigation based on the priority for each service gap of the plurality of service gaps. In an embodiment, the servicing cell prioritization controller (140) sorts the priority of the plurality of service gaps in the descending order or the ascending order. Further, the servicing cell prioritization controller (140) ranks the plurality of service gaps based on the sorted priority of the plurality of service gaps.

The servicing cell prioritization controller (140) is implemented by analog and/or digital circuits such as logic gates, integrated circuits, the processor (110), microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 2 shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the invention. One or more components can be combined together to perform same or substantially similar function in the electronic device (100).

Figure 3B:
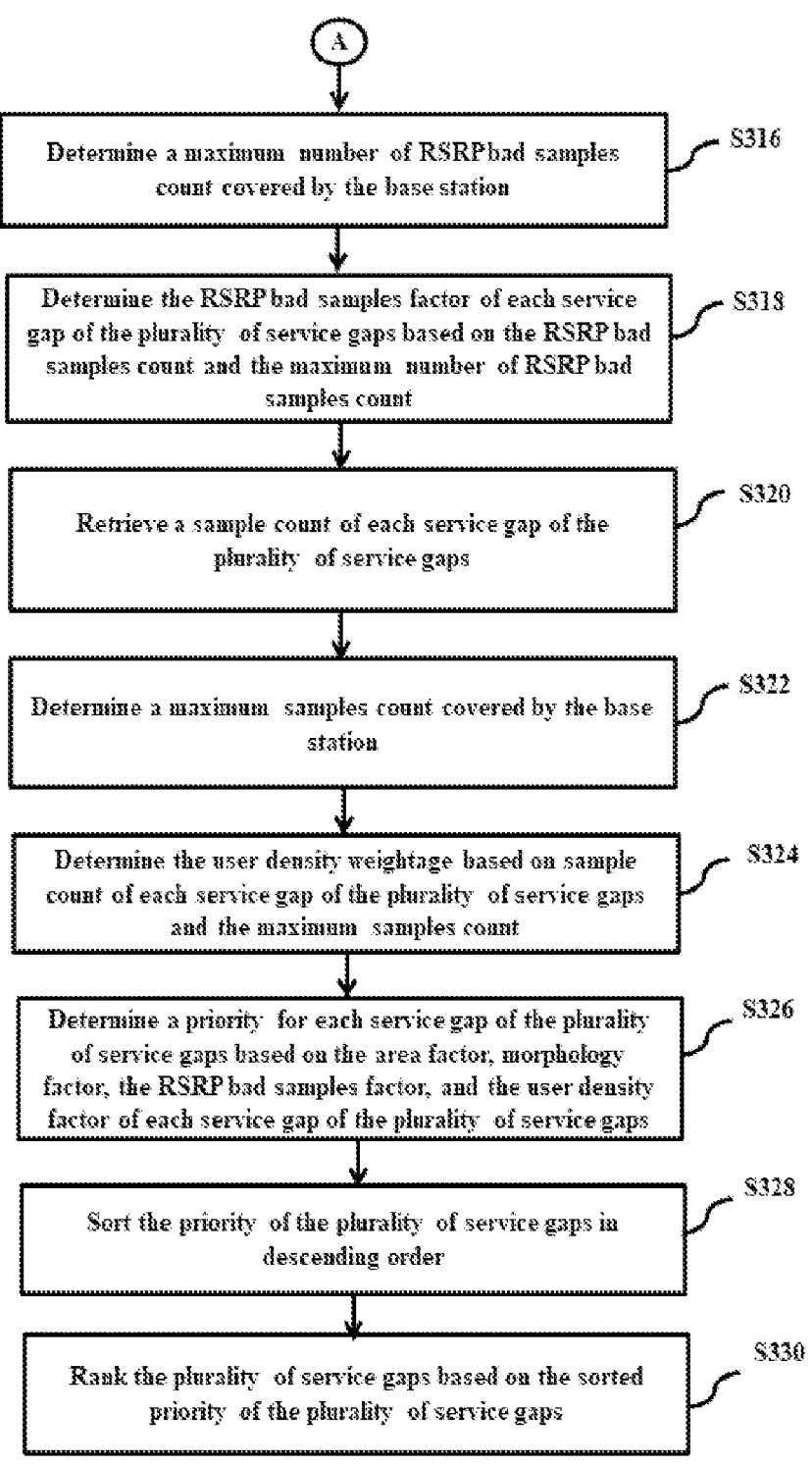

FIG. 3A to FIG. 3C are flow charts (S300) illustrating a method for prioritizing the service gaps in the wireless network (1000), according to the embodiments as disclosed herein. The operations (S302-S330) are handled by the servicing cell prioritization controller (140).

At S302, the method includes receiving the information about the plurality of service gaps. At S304, the method includes determining the set of polygons covered by each service gap of the plurality of service gaps associated with the base station (200) in the wireless network (1000). At S306, the method includes determining the maximum number of polygons of the base station (200). At S308, the method includes determining the area factor of each service gap of the plurality of service gaps based on the set of polygons and the maximum number of polygons of the base station (200). At S310, the method includes determining the DU morphology, the MU morphology, and the SU morphology of service gap of the plurality of service gaps. At S312, the method includes determining the morphology factor based on the DU morphology, the MU morphology, and the SU morphology.

At S314, the method includes determining the RSRP bad samples count for the predefined distance of each service gap of the plurality of service gaps. At S316, the method includes determining the maximum number of RSRP bad samples count covered by the base station (200). At S318, the method includes determining the RSRP bad samples factor of each service gap of the plurality of service gaps based on the RSRP bad samples count and the maximum number of RSRP bad samples count. At S320, the method includes retrieving the sample count of each service gap of the plurality of service gaps. At S322, the method includes determining the maximum samples count covered by the base station (200).

At S324, the method includes determining the user density weightage based on sample count of each service gap of the plurality of service gaps and the maximum samples count. At S326, the method includes determining the priority for each service gap of the plurality of service gaps based on the area factor, the morphology factor, the RSRP bad samples factor, and the user density factor of each service gap of the plurality of service gaps. At S328, the method includes sorting the priority of the plurality of service gaps in the descending order or the ascending order. At S330, the method includes ranking the plurality of service gaps based on the sorted priority of the plurality of service gaps.

FIG. 4 is an example flow chart (S400) illustrating a method for prioritizing service gaps in the wireless network (1000), according to the embodiments as disclosed herein. The operations (S402-S414) are handled by the servicing cell prioritization controller (140).

At S402, the method includes fetching all the service gap of one L4 geography (e.g., RF cluster or the like). At S404, the method includes computing the factors value (e.g., the area factor, the morphology factor, the RSRP bad samples factor, and the user density factor) for each of the following parameters (explained in steps S406a to S406d) for all service gaps polygons. At S406a, the method includes computing the area factor area factor for a service gap. In an example, the service gap is equal to (Area Polygon/max (Area Polygon) out of all the polygons in that L4 geography).

At S406b, the method includes computing the morphology factor. In an example, the morphology factor is equal to {3*[DU(Polygon)/DU (all polygons)]+2*[MU(Polygon)/MU (all polygons)]+[SU(Polygon)/SU (all polygons)]}/6. At S406c, the method includes computing the bad samples factor. In an example, the bad samples factor is equal to the RSRP bad samples count/square meters (Polygon)/Max. (RSRP Bad Samples count/square meters) out of all Polygons in a postal code. At S406d, the method includes computing the user density factor. In an example, the user density factor is equal to the count of user samples (Polygon)/Max count of user Samples (all polygons).

At S408, the method includes computing the total priority factor by adding all the factors with respect to the cell. In an example, individual multiplicative factor as follows (refer in table 2).

TABLE 2

| Priority Factor Name | Multiplicative Factor |
|---|---|
| Area | 1 |
| Morphology | 2 |
| Bad Samples | 1 |
| User density | 4 |

At S410, the method includes sorting total factors of all service gaps in the descending order or the ascending order. The descending order or the ascending order is defined by the user of the electronic device (100). At S412, the method includes creating a readable format (e.g., Computable Document Format (CDF) or the like) from the aggregated data. At S414, the method includes ranking the plurality of service gaps.

The various actions, acts, blocks, steps, or the like in the flow charts (S300 and S400) may be performed in the order presented, in a different order or simultaneously. Further, in some embodiments, some of the actions, acts, blocks, steps, or the like may be omitted, added, modified, skipped, or the like without departing from the scope of the invention.

Figure 5:
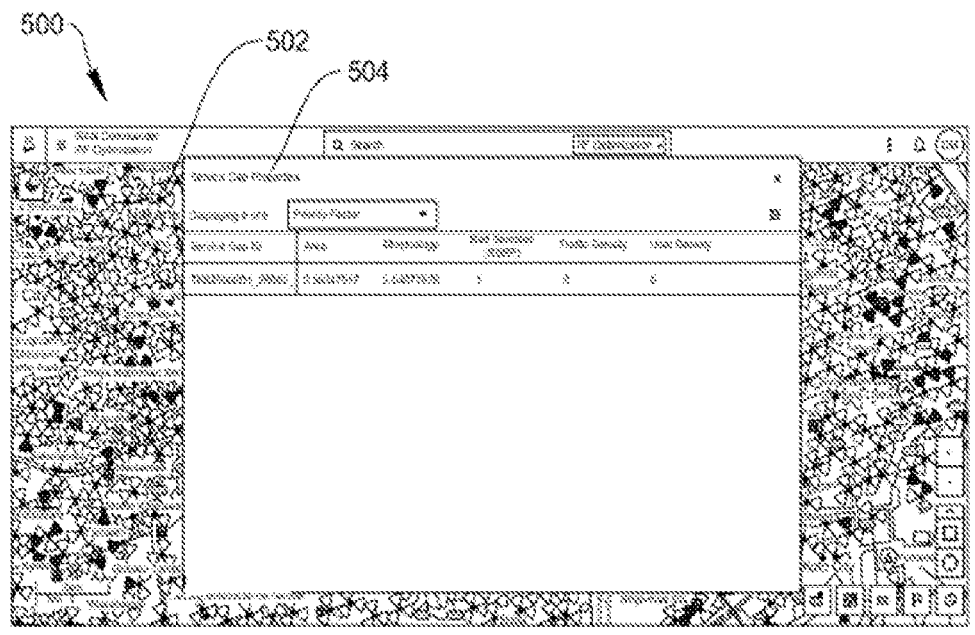
FIG. 5 and FIG. 6 are example illustrations in which a user interface of the electronic device displays service gap properties to prioritize the service gaps in the wireless network, according to the embodiments as disclosed herein.
Figure 6:
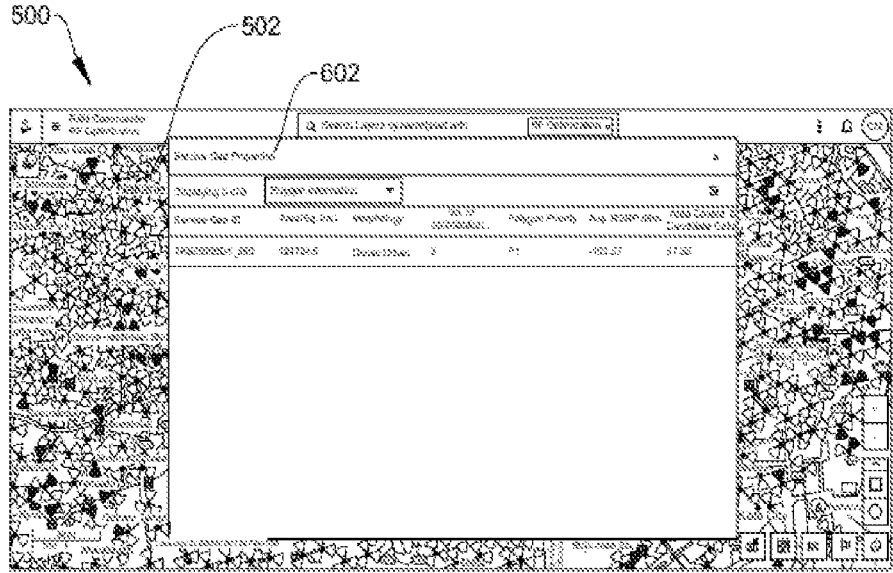

FIG. 5 and FIG. 6 are example illustrations (S500) in which a user interface (502) of the electronic device (100) displays service gap properties (504 and 602) to prioritize the service gaps in the wireless network (1000), according to the embodiments as disclosed herein.

Figure 7:
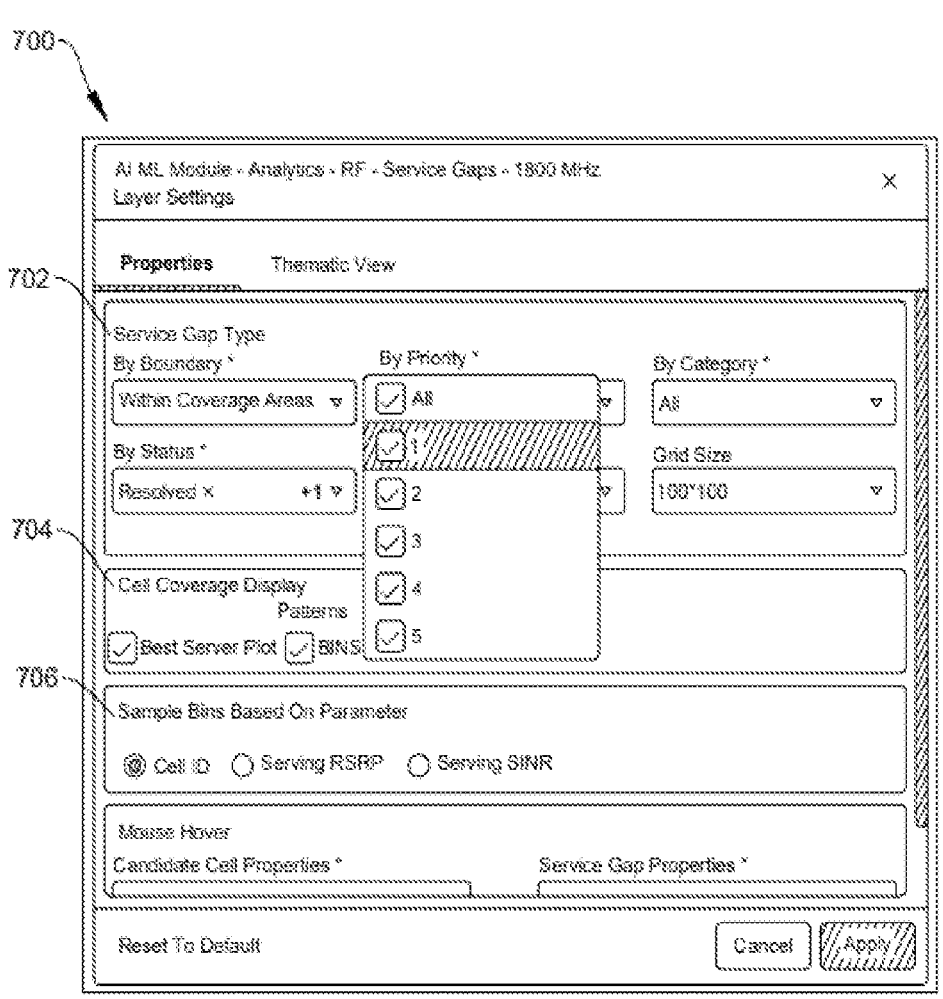
FIG. 7 is an example illustration in which a user interface of the electronic device displays a service gap type, a cell coverage display patterns, and a sample bins based on parameter to prioritize the service gaps in the wireless network, according to the embodiments as disclosed herein.

FIG. 7 is an example illustration (S700) in which a user interface of the electronic device (100) displays a service gap type (702), a cell coverage display pattern (704), and a sample bins based on parameter (706) to prioritize the service gaps in the wireless network (1000), according to the embodiments as disclosed herein.

The service gap type (702) is determined based on a boundary or a status information. The cell coverage display pattern (704) includes a best server plot and BINS. The sample bins based on parameter (706) includes a cell ID, a serving RSRP, and a serving SINR.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. An electronic device for prioritizing service gaps in a wireless network, wherein the electronic device comprises:
a memory; and
a processor, communicatively coupled to the memory, configured to:
receive information about a plurality of service gaps;
determine an area factor for each service gap of the plurality of service gaps;
determine a morphology factor of each service gap of the plurality of service gaps;
determine a Reference Signal Received Power (RSRP) bad samples factor of each service gap of the plurality of service gaps;
determine a user density factor of each service gap of the plurality of service gaps, the user density factor being determined based on a ratio between a sample count in a service gap of the plurality of service gaps and a maximum samples count covered by a base station associated with the service gap;
determine a priority for each service gap of the plurality of service gaps based on the area factor, the morphology factor, the RSRP bad samples factor, and the user density factor of each service gap of the plurality of service gaps; and
prioritize the plurality of service gaps for mitigation based on the priority for each service gap of the plurality of service gaps.

2. The electronic device as claimed in claim 1, wherein determine the area factor of each service gap of the plurality of service gaps comprises:
determine a set of polygons covered by each service gap of the plurality of service gaps associated with at least one base station in the wireless network;
determine a maximum number of polygons of the at least one base station; and
determine the area factor of each service gap of the plurality of service gaps based on the set of polygons and the maximum number of polygons of the at least one base station.

3. The electronic device as claimed in claim 1, wherein determine the morphology factor of each service gap of the plurality of service gaps comprises:
determine a Dense Urban (DU) morphology, a Medium Urban (MU) morphology, and a Suburban (SU) morphology of service gap of the plurality of service gaps; and
determine the morphology factor based on the DU morphology, the MU morphology, and the SU morphology.

4. The electronic device as claimed in claim 3, wherein determine the DU morphology of each service gap of the plurality of service gaps comprises:

determine a set of DU polygons covered by each service gap of the plurality of service gaps associated with at least one base station in the wireless network;
determine a maximum number of DU polygons of the at least one base station; and
determine the DU morphology based on the set of DU polygons, the maximum number of DU polygons, and a weightage associated with the DU morphology.

5. The electronic device as claimed in claim 3, wherein determine the MU morphology of each service gap of the plurality of service gaps comprises:
determine a set of MU polygons covered by each service gap of the plurality of service gaps associated with at least one base station in the wireless network;
determine a maximum number of MU polygons of the at least one base station; and
determine the MU morphology based on the set of MU polygons, the maximum number of MU polygons, and a weightage associated with the MU morphology.

6. The electronic device as claimed in claim 3, wherein determine the SU morphology of each service gap of the plurality of service gaps comprises:
determine a set of SU polygons covered by each service gap of the plurality of service gaps associated with at least one base station in the wireless network;
determine a maximum number of SU polygons of the at least one base station; and
determine the SU morphology based on the set of SU polygons, the maximum number of SU polygons, and a weightage associated with the SU morphology.

7. The electronic device as claimed in claim 1, wherein determine the RSRP bad samples factor of each service gap of the plurality of service gaps comprises:
determine a RSRP bad samples count for a predefined distance of each service gap of the plurality of service gaps;
determine a maximum number of RSRP bad samples count covered by the base station; and
determine the RSRP bad samples factor of each service gap of the plurality of service gaps based on the RSRP bad samples count and the maximum number of RSRP bad samples count.

8. The electronic device as claimed in claim 1, wherein determine the user density factor of each service gap of the plurality of service gaps comprises:
retrieve a sample count of each service gap of the plurality of service gaps;
determine the maximum samples count covered by the base station; and
determine the user density factor based on sample count of each service gap of the plurality of service gaps and the maximum samples count.

9. The electronic device as claimed in claim 1, wherein prioritize the plurality of service gaps based on the priority for each service gap of the plurality of service gaps comprises:
sort the priority of the plurality of service gaps in descending order; and
rank the plurality of service gaps based on the sorted priority of the plurality of service gaps.

10. The electronic device as claimed in claim 1, wherein the area factor is determined based a ratio of an area of a service gap of the plurality of service gaps to a maximum area corresponding to a base station associated with the service gap.

11. The electronic device as claimed in claim 1, wherein the morphology factor is a multiplicative factor that varies according to a morphology category from among a plurality of predetermined morphology factors.

12. A method for prioritizing service gaps in a wireless network, wherein the method comprises:

receiving, by an electronic device in the wireless network, information about a plurality of service gaps;

determining, by the electronic device, an area factor for each service gap of the plurality of service gaps;

determining, by the electronic device, a morphology factor of each service gap of the plurality of service gaps;

determining, by the electronic device, a Reference Signal Received Power (RSRP) bad samples factor of each service gap of the plurality of service gaps;

determining, by the electronic device, a user density factor of each service gap of the plurality of service gaps, the user density factor being determined based on a ratio between a sample count in a service gap of the plurality of service gaps and a maximum samples count covered by a base station associated with the service gap;

determining, by the electronic device, a priority for each service gap of the plurality of service gaps based on the area factor, the morphology factor, the RSRP bad samples factor, and the user density factor of each service gap of the plurality of service gaps; and prioritizing, by the electronic device, the plurality of service gaps for mitigation based on the priority for each service gap of the plurality of service gaps.

13. The method as claimed in claim 12, wherein determining, by the electronic device, the area factor of each service gap of the plurality of service gaps comprises:

determining, by the electronic device, a set of polygons covered by each service gap of the plurality of service gaps associated with at least one base station in the wireless network;

determining, by the electronic device, a maximum number of polygons of the at least one base station; and determining, by the electronic device, the area factor of each service gap of the plurality of service gaps based on the set of polygons and the maximum number of polygons of the at least one base station.

14. The method as claimed in claim 12, wherein determining, by the electronic device, the morphology factor of each service gap of the plurality of service gaps comprises:

determining, by the electronic device, a Dense Urban (DU) morphology, a Medium Urban (MU) morphology, and a Suburban (SU) morphology of service gap of the plurality of service gaps; and determining, by the electronic device, the morphology factor based on the DU morphology, the MU morphology, and the SU morphology.

15. The method as claimed in claim 14, wherein determining, by the electronic device, the DU morphology of each service gap of the plurality of service gaps comprises:

determining, by the electronic device, a set of DU polygons covered by each service gap of the plurality of service gaps associated with at least one base station in the wireless network;

determining, by the electronic device, a maximum number of DU polygons of the at least one base station; and determining, by the electronic device, the DU morphology based on the set of DU polygons, the maximum number of DU polygons, and a weightage associated with the DU morphology.

16. The method as claimed in claim 14, wherein determining, by the electronic device, the MU morphology of each service gap of the plurality of service gaps comprises:

determining, by the electronic device, a set of MU polygons covered by each service gap of the plurality of service gaps associated with at least one base station in the wireless network;

determining, by the electronic device, a maximum number of MU polygons of the at least one base station; and determining, by the electronic device, the MU morphology based on the set of MU polygons, the maximum number of MU polygons, and a weightage associated with the MU morphology.

17. The method as claimed in claim 14, wherein determining, by the electronic device, the SU morphology of each service gap of the plurality of service gaps comprises:

determining, by the electronic device, a set of SU polygons covered by each service gap of the plurality of service gaps associated with at least one base station in the wireless network;

determining, by the electronic device, a maximum number of SU polygons of the at least one base station; and determining, by the electronic device, the SU morphology based on the set of SU polygons, the maximum number of SU polygons, and a weightage associated with the SU morphology.

18. The method as claimed in claim 12, wherein determining, by the electronic device, the RSRP bad samples factor of each service gap of the plurality of service gaps comprises:

determining, by the electronic device, a RSRP bad samples count for a predefined distance of each service gap of the plurality of service gaps;

determining, by the electronic device, a maximum number of RSRP bad samples count covered by the base station; and determining, by the electronic device, the RSRP bad samples factor of each service gap of the plurality of service gaps based on the RSRP bad samples count and the maximum number of RSRP bad samples count.

19. The method as claimed in claim 12, wherein determining, by the electronic device, the user density factor of each service gap of the plurality of service gaps comprises:

retrieving, by the electronic device, a sample count of each service gap of the plurality of service gaps;

determining, by the electronic device, the maximum samples count covered by the base station; and determining, by the electronic device, the user density factor based on sample count of each service gap of the plurality of service gaps and the maximum samples count.

20. The method as claimed in claim 12, wherein prioritizing, by the electronic device, the plurality of service gaps based on the priority for each service gap of the plurality of service gaps comprises:

sorting, by the electronic device, the priority of the plurality of service gaps in descending order; and ranking, by the electronic device, the plurality of service gaps based on the sorted priority of the plurality of service gaps.

* * * * *